UNITED STATES PATENT OFFICE.

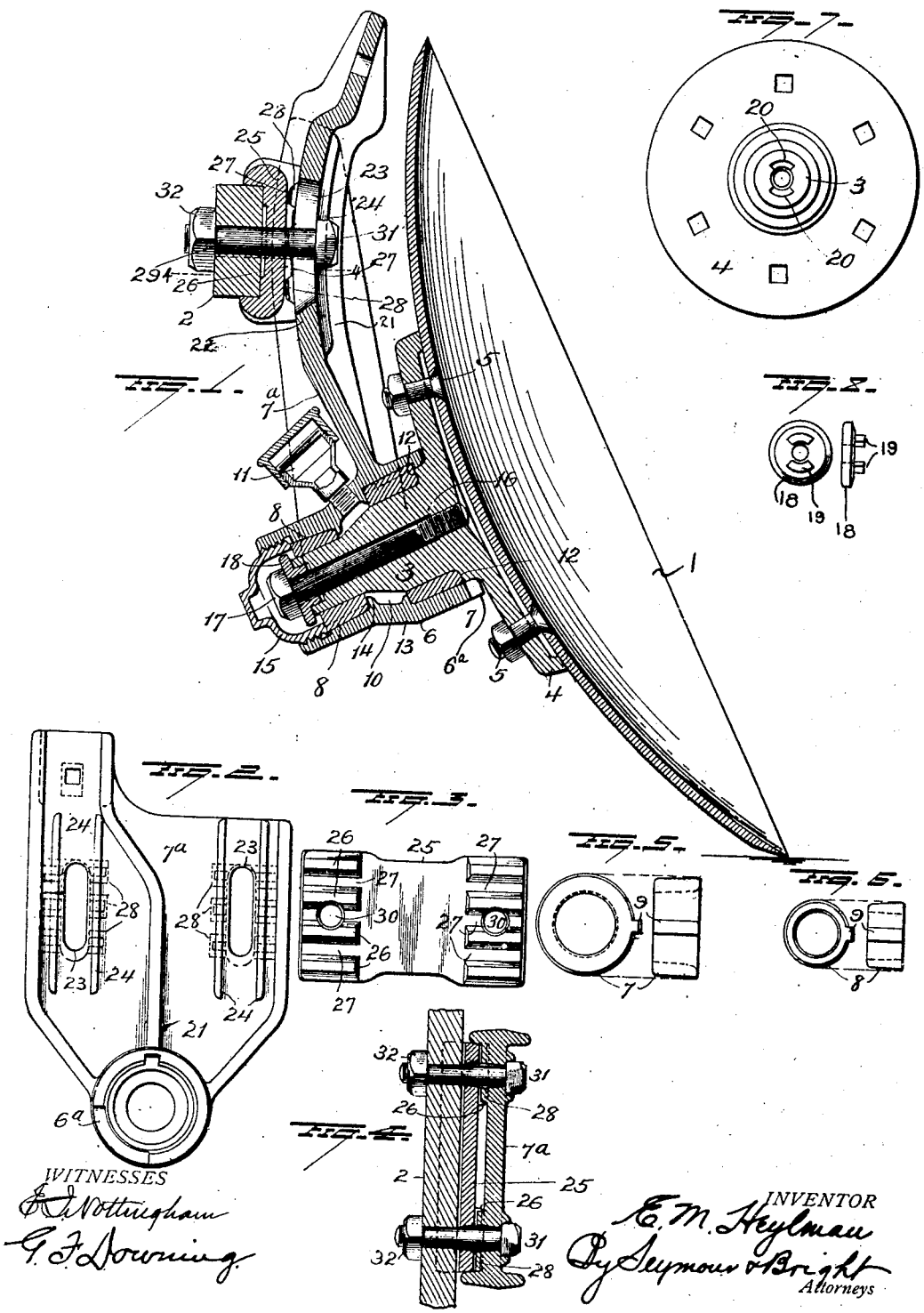

EDWARD M. HEYLMAN, OF SOUTH BEND, INDIANA, ASSIGNOR TO OLIVER CHILLED PLOW WORKS, OF SOUTH BEND, INDIANA.

AGRICULTURAL IMPLEMENT.

1,333,980.  Specification of Letters Patent.  Patented Mar. 16, 1920.

Application filed March 14, 1918. Serial No. 222,334.

*To all whom it may concern:*

Be it known that I, EDWARD M. HEYLMAN, a citizen of the United States, and a resident of South Bend, in the county of Saint Joseph and State of Indiana, have invented certain new and useful Improvements in Agricultural Implements; and I do hereby declare the following to be a full, clear, and exact description of the invention, such as will enable others skilled in the art to which it appertains to make and use the same.

This invention relates to improvements in agricultural implements, such as plows, and more particularly to mountings for the disks or soil-engaging members thereof,—one object of the invention being to so construct and arrange a mounting for the disk or soil-engaging member that the pitch of the same may be adjusted without lowering or raising its cutting edge.

With this and other objects in view, the invention consists in certain novel features of construction and combinations of parts as hereinafter set forth and pointed out in the claims.

In the accompanying drawings; Figure 1 is a sectional view through a soil-engaging disk and its mounting embodying my improvements; Fig. 2 is a view in elevation showing the supporting arm or plate; Fig. 3 is a detail view of the bearing block for the supporting arm or plate; Fig. 4 is a sectional view on the line 4—4 of Fig. 1, and Figs. 5, 6, 7 and 8 are detail views.

1 represents a soil-engaging disk, 2 a beam or other part of a plow structure with which the disk is connected through the medium of the instrumentalities hereinafter described.

A spindle 3 for the disk is provided with an annular flange 4 which is securely fastened to the back of said disk by means of bolts 5. The spindle 3 is mounted in a hub 6 and the latter is connected, through the medium of an arm or plate 7ª (which may be integral with said hub) and attaching devices, with the beam or frame member 2. The hub 6 is also made with an opening 6ª to permit dirt that may work in from the top and front, to drop out.

The spindle 3 is made large at the portion thereof nearest the flange 4 in order to gain adequate strength at this portion of the spindle, and the outer portion of said spindle is contracted in size so that the outer end of the bearing may be so reduced in size as to prevent the same from dragging against the "bank" in case of deep plowing. The hub 6 has the same general shape as the spindle, and two separate bushings 7, 8 are employed,—the bushing 7 encircling the larger portion of the spindle, and the bushing 8 encircling the smaller portion thereof. These bushings are made with keys 9 to enter suitable key-ways in the hub, and the space between the two bushings forms a lubricant chamber 10, with which a lubricant cup 11 placed upon the top of the hub communicates. The larger bushing 7 bears at one end against a shoulder 12 on the spindle and at the other end it has a thrust bearing against a flange or rib 13 in the hub 6, while the smaller bushing 8 rests at one end against a flange or rib 14 in the hub and at the other end against a cap 15 screwed into the end of the hub. Thus the thrust of the disk coming against the bushing member 7 will be resisted by the rib 13, and displacement of the smaller bushing member 8 will be prevented when the plow is raised, by the rib 14. A bolt 16 passes through the spindle 3 and its inner portion is threaded to enter the threaded portion of the bore in said spindle. The outer end of the bolt 16 is provided with a head 17, between which and the end of the spindle, a washer 18 is located. This washer overhangs the bushing member 8 and is provided with lugs 19 which enter sockets 20 in the end of the spindle 3. It will be seen that the bearing parts of the spindle at the bushings are substantially straight, and this is an advantage over a taper construction because, if there is any end play, there will not be too much up-and-down play in the bearing when the spindle is drawn forwardly.

The supporting arm 7ª is made in the form of a comparatively broad plate or casting having suitable strengthening ribs 21, and said arm or plate is curved somewhat as indicated at 22. The arm or plate 7ª is provided adjacent to its respective side edges with parallel elongated slots 23, 23, and at respective sides of each of these slots, parallel ribs 24 are provided on the inner face of said arm or plate. A block 25 is disposed between the arm or plate 7ª and the beam 2 and is recessed to receive said beam. The inner side of the block 25 is curved to conform to the curvature of the arm or plate 7ª and sets of lugs 26 are provided on said inner face of the block 25, whereby notches 27 are formed, and sets of lugs 28 on the arm or plate 7ᵃ mesh in said notches. Bolts 29 pass through the beam 2, through holes 30 in the block 25, and through the elongated slots 23 in the arm or plate 7ᵃ,—each of said bolts being provided with a head 31 on one end held between the ribs 24 on the arm 7ᵃ and a nut 32 on the other end.

In order to adjust the pitch of the soil-engaging disk, the operator will loosen the nut on the bolt 29 and move the arm or plate 7ᵃ up or down on the block 25,—the intermeshing of the lugs 26—28 holding the same in the position to which it may be adjusted when the nut on the bolt shall have been again tightened. By reason of the curved bearing of the arm or plate 7ᵃ on the block 25, the soil-engaging disk may be adjusted from one pitch to another without raising or lowering the cutting edge of said disk relatively to the ground, and the same would be true were a soil-engaging member of the mold-board and share type of plow body employed instead of a disk.

Important advantages are incident to the construction of the adjusting means above described, in that the various adjustments of the pitch can be effected without necessitating adjustment of the carrying wheels on the frame to insure uniform depth of plowing when the soil-engaging member is adjusted from one pitch to another.

I do not claim herein the specific construction of the disk bearing devices herein disclosed, the same constituting the subject of a divisional application filed September 27th, 1918, and designated by Serial No. 255,928.

Various slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. The combination with a frame member and a soil-engaging member, of an arm connected with the soil engaging member and having a curved portion and an elongated slot, a fixed block disposed between the frame member and the curved portion of said arm, said block and arm having intermeshing lugs, and a bolt passing through the frame member and block and through the elongated slot in said arm, said bolt provided with a head at one end and a nut on the other end.

2. The combination with a frame member, and a soil-engaging member, of a plate forming an arm connected with said soil-engaging member and having a curved portion provided with a plurality of slots, a fixed bearing block disposed between said frame member and the curved portion of said plate, said plate and block having intermeshing lugs adjacent to the slotted portion of the plate, bolts passing through the frame member and block and through the slots of said plate, each of said bolts having a head at one end and a nut on the other end, and means for preventing said bolts from turning.

In testimony whereof, I have signed this specification in the presence of two subscribing witnesses.

EDWARD M. HEYLMAN.

Witnesses:
 EDWIN NICAR,
 GEORGE LANPHERE.